United States Patent [19]

Ukai et al.

[11] Patent Number: 4,813,294
[45] Date of Patent: Mar. 21, 1989

[54] STRUCTURE FOR PREVENTING OIL CONTAMINATION FOR HYDRAULICALLY OPERATED POWER STEERING SYSTEM

[75] Inventors: Norio Ukai, Saitama; Yuzuru Kondou, Osaka, both of Japan

[73] Assignees: Honda Giken Kogyo Kabushiki Kaisha, Tokyo; Nihon Magnet Kogyo Kabushiki Kaisha, Osaka, both of Japan

[21] Appl. No.: 141,519

[22] Filed: Jan. 7, 1988

[30] Foreign Application Priority Data

Aug. 1, 1987 [JP] Japan .................. 62-1088[U]

[51] Int. Cl.⁴ .................. B62D 5/06; B62D 3/12; B03C 1/30
[52] U.S. Cl. .................. 74/388 PS; 74/422; 74/498; 60/454; 180/132; 180/148; 184/6.25; 210/222
[58] Field of Search .................. 74/388 PS, 422, 498, 74/89.17; 60/454; 92/78; 180/132, 148; 184/6.25; 210/222, 223

[56] References Cited

U.S. PATENT DOCUMENTS

| | | | |
|---|---|---|---|
| 2,996,162 | 8/1961 | Lehde | 210/222 X |
| 3,151,703 | 10/1964 | Benk | 210/222 X |
| 3,195,467 | 7/1965 | Collet | 417/420 |
| 3,480,145 | 11/1969 | Gladden | 210/223 |
| 4,182,221 | 1/1980 | Presley | 180/148 X |

FOREIGN PATENT DOCUMENTS 62-74075 12/1987 Japan .

*Primary Examiner*—Allan D. Herrmann
*Attorney, Agent, or Firm*—Birch, Stewart, Kolasch & Birch

[57] ABSTRACT

A structure for preventing oil from being contaminated in a hydraulically operated power steering system for use in a motor vehicle has a cylindrical permanent magnet disposed in a working oil chamber housing a rack of an iron-base material and a pinion meshing therewith. The cylindrical permanent magnet has a central opening through which the rack extends, the cylindrical permanent magnet having magnetic poles positioned along a direction parallel to the axis of the rack.

3 Claims, 1 Drawing Sheet

U.S. Patent    Mar. 21, 1989    4,813,294
FIG.1
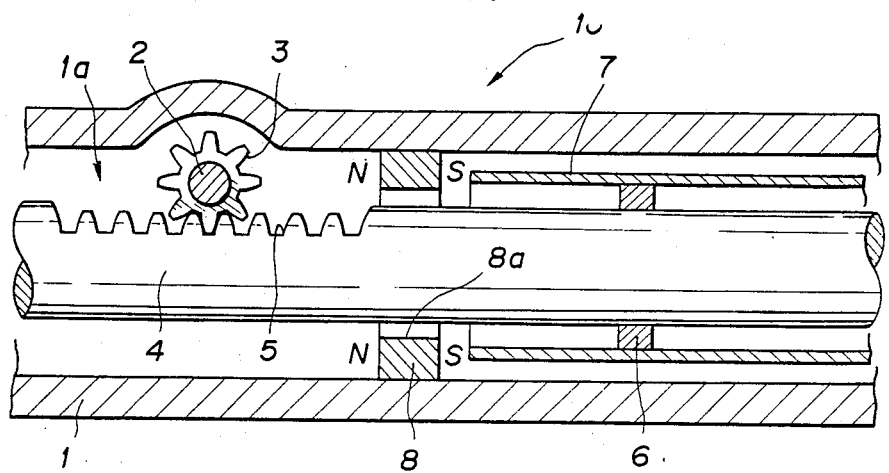
FIG.2A  FIG.2B  FIG.2C
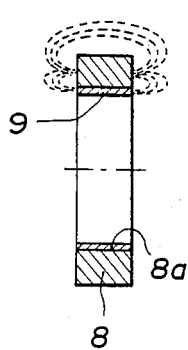 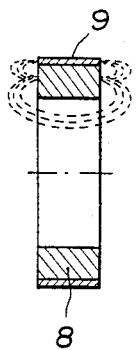 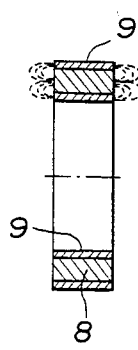
FIG.2D  FIG.2E  FIG.2F
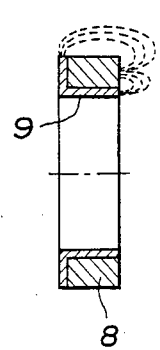 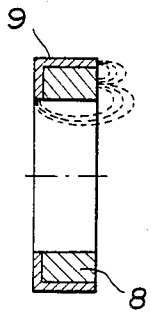 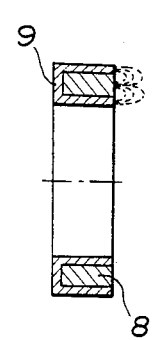

STRUCTURE FOR PREVENTING OIL CONTAMINATION FOR HYDRAULICALLY OPERATED POWER STEERING SYSTEM

BACKGROUND OF THE INVENTION

1. Field of the Invention

The present invention relates to a structure for preventing oil from being contaminated, and more particularly to a structure for preventing oil contamination for a hydraulically operated power steering system of the rack-and-pinion type.

2. Description of the Relevant Art

Japanese Laid-Open Utility Model Publication No. 62-74075 published May 12, 1987 discloses a structure for preventing oil contamination for a hydraulically operated power steering system of the rack-and-pinion type. The disclosed structure includes a plurality of ring-shaped permanent magnets disposed at respective plural locations in a working oil chamber within the gear box of the steering system, with a rack extending through the ring-shaped permanent magnets. A pinion and grack teeth are held in mesh with each other in the gear box. Iron-base metal particles which may be produced by such meshing engagement between the pinion and the rack teeth are magnetically attracted to the permanent magnets thereby to prevent oil in the working oil chamber from being contaminated. As a result, oil leakage from seals and damage to sliding portions, which would otherwise be caused by entrapped metal particles, are prevented from occurring.

The rack is made of an iron-base material that can be magnetized, and the ring-shaped permanent magnets are disposed relatively closely to the rack. Therefore, the rack may possibly be magnetized by the permanent magnets to the extent that the rack itself may magnetically attract iron-base metal particles, thus lowering the ability of the permanent magnets to attract the iron-base metal particles. To solve this problem, the disclosed structure includes members of a nonmagnetic material such as synthetic resin, for example, which are disposed between the ring-shaped permanent magnets and the rack.

However, use of the nonmagnetic members of synthetic resin makes the oil contamination preventing structure somewhat complex in construction.

It would be preferable in efforts to provide a simpler and less expensive structure for preventing oil contamination if the conventional nonmagnetic members of synthetic resin were dispensed with.

The present invention has been made in an attempt to circumvent the aforesaid drawbacks of the conventional structure for preventing oil contamination for a hydraulically operated power steering system.

SUMMARY OF THE INVENTION

It is an object of the present invention to provide a simple and inexpensive structure for preventing oil from being contaminated for a hydraulically operated power steering sytem, the structure including a ring-shaped permanent magnet disposed closely to a rack within a working oil chamber and having no nonmagnetic member for preventing the rack from being magnetized.

To achieve the above object, there is provided in accordance with the present invention a structure for preventing oil from being contaminated in a hydraulically operated power steering system for use in a motor vehicle, the power steering system having a working oil chamber housing a rack of an iron-base material and a pinion meshing therewith, the structure comprising a cylindrical permanent magnet disposed in the working oil chamber and having a central opening through which the rack extends, the cylindrical permanent magnet having magnetic poles positioned along a direction parallel to the axis of the rack.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 1 is a fragmentary cross-sectional view of a structure for preventing oil from being contaminated for a hydraulically operated power steering system, according to a preferred embodiment of the present invention; and FIGS. 2A through 2F are cross-sectional views of magnetic flux guides according to different embodiments, which can be attached to a cylindrical permanent magnet in the structure shown in FIG. 1.

DETAILED DESCRIPTION OF THE PREFERRED EMBODIMENTS

The reference numeral 10 in FIG. 1 indicates a structure for preventing oil from being contaminated in a hydraulically operated power steering system for use in a motor vehicle (not shown), in accordance with a preferred embodiment of the present invention. The structure 10 includes a cylindrical permanent magnet 8 disposed in a working oil chamber 1a defined in a gear box 1 of the steering system and filled with working oil, the cylindrical permanent magnet 8 being held against the inner peripheral surface of the working oil chamber 1a. In the gear box 1, there are also disposed a rack 4 of an iron-base material with its opposite ends coupled to front wheel tie rods (not shown) and a pinion 3 of an iron-base material which is held in mesh with rack teeth 5 of the rack 4. The pinion 3 is fitted over a pinion shaft 2 operatively coupled to a steering shaft (not shown). A piston 6 is fixedly mounted on the rack 4 remotely from the rack teeth 5. The piston 6 is slidably held against the inner peripheral surface of a cylinder barrel 7 disposed in the gear box 1. As the steering shaft is angularly moved, working oil is supplied under a prescribed pressure to one of two oil chambers divided by the piston 6 through a directional control valve (not shown) for thereby applying assisted steering power to the rack 4.

The cylindrical permanent magnet 8 is positioned coaxially with the rack 4 between the cylinder barrel 7 and the pinion 3, the cylindrical permanent magnet 8 having a central cylindrical hole 8a through which the rack 4 extends. The cylindrical permanent magnet 8 is magnetized such that its magnetic poles N, S are arranged along a direction parallel to the axis of the rack 4. Stated otherwise, the cylindrical permanent magnet 8 disposed in the gear box 1 has a central opening 8a through which the rack 4 extends and has magnetic poles N, S positioned along a direction parallel to the axis of the rack 4.

Since the permanent magnet 8 is located closely to the pinion 3, iron-base metal powder particles which may be produced by meshing engagement between the pinion 3 and the rack teeth 5 are magnetically attracted to the permanent magnet 8. Therefore, the working oil in the gear box 1 is effectively prevented from being contaminated by such iron-base metal powder particles. Moreover, inasmuch as the magnetic poles N, S of the permanent magnet 8 are arranged along a direction parallel to the axis of the rack 4, the rack 4 extending through the cylindrical permanent magnet 8 is effectively prevented from being magnetized thereby. As a result, it is not necessary to provide a member of a nonmagnetic material between the permanent magnet 8 and the rack 4, for example. The structure 10 for preventing oil contamination is thus simple in construction and inexpensive to manufacture.

FIGS. 2A through 2F show various magnetic flux guides 9 according to different embodiments which can be attached to the cylindrical permanent magnet 8 of the structure 10. These magnetic flux guides 9 are made of iron, for example.

FIG. 2A shows a magnetic flux guide 9 in the form of a short pipe fitted in the central opening 8a of the cylindrical permanent magnet 8. The magnetic flux guide 9 serves to vary lines of magnetic force such that the flux density is reduced in the rack 4 for more effectively preventing the rack 4 from being magnetized.

The rack 4 is also more effectively prevented from being magnetized by the magnetic flux guides 9 shown in FIGS. 2B through 2F.

More specifically, the magnetic flux guide 9 shown in FIG. 2B comprises a short pipe fitted over the cylindrical permanent magnet 8. The magnetic flux guide 9 shown in FIG. 2C comprises a short outer pipe member and a short inner pipe member which are fitted respectively over and in the cylindrical permanent magnet 8. According to the embodiment shown in FIG. 2D, the magnetic flux guide 9 is in the shape of a short pipe fitted in the central opening of the cylindrical permanent magnet 8 and having a flange extending radially outwardly from one end of the guide 9 in covering relation to one axial end surface of the magnet 8. The magnetic flux guide 9 illustrated in FIG. 2E is in the shape of a short pipe fitted over the cylindrical permanent magnet 8 and having a flange extending radially inwardly from one end of the guide 9 in covering relation to one axial end surface of the magnet 8. The magnetic flux guide 9 shown in FIG. 2F comprises short inner and outer pipe members fitted respectively in and over the cylindrical permanent magnet 8 and joined to each other by a flange covering one axial end surface of the magnet 8.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A structure for preventing oil from being contaminated in a hydraulically operated power steering system for use in a motor vehicle, the power steering system having a working oil chamber housing a rack of any iron-base material and a pinion meshing therewith, said structure comprising:

a cylindrical permanent magnet disposed in the working oil chamber and having a central opening through which said rack extends, said cylindrical permanent magnet having magnetic poles positioned along a direction parallel to the axis of said rack; and a magnetic flux guide covering at least a portion of said cylindrical permanent magnet.

2. The structure according to claim 1, wherein said cylindrical permanent magnet is disposed coaxially with said rack.

3. The structure according to claim 1, wherein said magnetic flux guide includes a portion positioned in the central opening of the cylindrical permanent magnet.

* * * * *

UNITED STATES PATENT AND TRADEMARK OFFICE
CERTIFICATE OF CORRECTION

PATENT NO. : 4,813,294
DATED : March 21, 1989
INVENTOR(S) : Norio UKAI and Yuzuru KONDOU It is certified that error appears in the above-identified patent and that said Letters Patent is hereby corrected as shown below:

On the title page Item (30)
Change priority date from "August 1, 1987", to

--January 8, 1987--.

Signed and Sealed this

Twenty-fourth Day of April, 1990

Attest:

HARRY F. MANBECK, JR.

*Attesting Officer*  *Commissioner of Patents and Trademarks*